July 21, 1964 J. FRATANTUNO 3,141,977
APPARATUS FOR MEASURING THE RADIOACTIVITY OF LIQUID SAMPLES
Filed July 29, 1959 5 Sheets-Sheet 1

FIG. 1

INVENTOR.
JOSEPH FRATANTUNO
BY
ATTORNEY

July 21, 1964 J. FRATANTUNO 3,141,977
APPARATUS FOR MEASURING THE RADIOACTIVITY OF LIQUID SAMPLES
Filed July 29, 1959 5 Sheets-Sheet 2

FIG. 2

INVENTOR.
JOSEPH FRATANTUNO
BY
*Joseph Weingarten*
ATTORNEY

FIG. 3

July 21, 1964    J. FRATANTUNO    3,141,977
APPARATUS FOR MEASURING THE RADIOACTIVITY OF LIQUID SAMPLES
Filed July 29, 1959    5 Sheets-Sheet 4

INVENTOR.
JOSEPH FRATANTUNO
BY
*Joseph Weingarten*
ATTORNEY

FIG. 6

United States Patent Office 3,141,977
Patented July 21, 1964

3,141,977
APPARATUS FOR MEASURING THE RADIO-
ACTIVITY OF LIQUID SAMPLES
Joseph Fratantuno, Waltham, Mass., assignor, by mesne assignments, to Laboratory for Electronics, Inc., Boston, Mass., a corporation of Delaware
Filed July 29, 1959, Ser. No. 830,381
13 Claims. (Cl. 250—106)

This invention relates in general to radioactivity measurement and more particularly to automatic apparatus for processing and measuring liquid radioactivity samples.

The analysis of radioactive sample material frequently involves a determination of the disintegration rate of the sample. This disintegration rate, while having a true average value for any given sample, is in itself a random process and hence the accuracy of measuring any given disintegration rate will depend on the total number of disintegrations observed. As a result, the accuracy varies not directly with the time of measurement but indirectly, depending on the counting rate. Samples of this type are generally analyzed by placing the sample material in proximity to, or within, the sensitive area of a radiation detector of appropriate type and recording the events measured by that detector on an electronic counter while observing the time required to acquire a predetermined total count.

Since radioactive samples are analyzed in many applications, particularly those involving tracer techniques wherein a minute amount of the radioactive material is present, the disintegration rate of a particular sample may be relatively slow, and hence the time required to totalize a significant number of counts may be quite long. This fact, taken together with the further fact that a relatively large quantity of these samples may have to be analyzed in a typical detailed tracer program, renders the analysis and counting procedures time consuming and tedious. As a result of these problems, automatic equipment for processing, analyzing and measuring a large quantity of samples in this same fashion has been devised and made commercially available. Such automatic sample handling and counting equipment has been relatively successful for the particular methods of detection and type of samples for which it was produced. In general, this automatic equipment was devised to operate with prepared solid samples, particularly of beta radiation, and to operate in conjunction with detectors of the Geiger-Mueller tube type. More recently, however, the need for analysis of samples which are essentially in forms which are not handled as readily, such as liquids, and in which the radiation to be detected is gamma radiation, has appeared in many applications of radioisotopes. Thus, liquid gamma samples present specific problems which the previous automatic equipment does not provide for and which render it partially or completely ineffective in analysis of this type of sample. Most detectors in such systems are designed to operate in conjunction with a solid sample having the general form of a planchet or disk and are highly inefficient for the measurement of a vial of liquid.

Detectors for this latter type of sample have, however, been designed independently of automatic sample changers and are generally known as well scintillation counters. They consist of a scintillating crystal which produces light pulses in response to impingent radiation, which light is converted into an electrical pulse by means of a conventional photo-multiplier tube. The crystal is formed as a hollow cored cylinder and the vial containing the liquid sample is placed within this core for measurement purposes. Prior art sample changers, however, which were essentially designed to operate by moving samples in a plane beneath a detector are not adequate for use in conjunction with this type of detector.

A second serious problem in the counting of liquid or similar gamma samples arises from the fact that these samples emit gamma radiation. This radiation is, of course, highly penetrative and hence, if precautions are not taken, an accumulation of a number of these samples in reasonable proximity to a detector sensitive to their radiations will increase the background, or ambient counting rate, of the detector. This reduces the sensitivity of the system and masks the counts contributed by the particular sample placed within the core.

From the above description it will be clear that the equipment designed for automatic handling of beta planchet samples in conjunction with Geiger-Mueller detectors and scintillation detectors, not of the well type, is not suitable or even readily adaptable to the handling of liquid gamma samples.

It is therefore a primary object of the present invention to provide an efficient, economic, automatic apparatus for storing, handling, and counting a large quantity of liquid gamma samples.

It is another object of the present invention to provide automatic counting equipment wherein the sensitive detector volume is isolated from the gamma radiations of the accumulated storage volume.

It is still another object of the present invention to provide a novel, efficient, economic mechanism for transferring samples from a storage position to a counting position within the core of a well counter.

It is another object of this invention to provide an efficient and simplified automatic counting apparatus for handling radioactive samples.

These and other objects and advantages will become apparent from the following detailed descriptions when taken in conjunction with the accompanying drawing in which.

Figure 1:
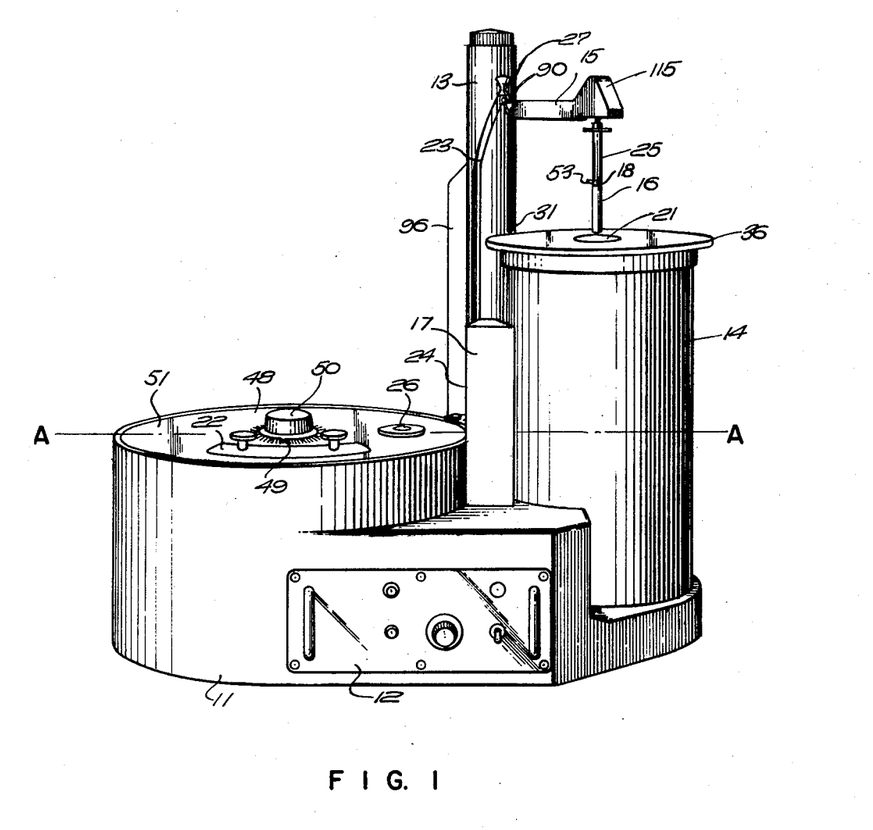
FIG. 1 is a general perspective view of the exterior configuration of apparatus embodying the inventive concepts of this invention.

With reference now specifically to FIG. 1, an external perspective view of the sample changer of this invention is shown. It is seen to include a generally cylindrical cast base 11 which has a front control panel 12 and upon which is mounted a relatively slender cylindrical tower 13 and a cylindrical detector shield 14. A second radiation shield 17 is mounted on the side of tower 13 in such a fashion that it effectively blocks a large portion of radiation from the storage unit from the detector area. A transport arm 15 is shown extending from tower 13, holding a sample vial 16 poised above the orifice 21 of the detector shield 14. The apparatus operates in conjunction with a conventional electronic scaler (not shown) which records the measurement information from the detector and supplies signals indicating when the measurement is completed. Before describing in any further detail the mechanical apparatus as such, the general functions will be discussed in order that a clearer understanding of the cooperative nature of the mechanism may be obtained.

Broadly speaking the sample changer can be considered as including three separate and cooperative functions: storage, measurement and transport. The storage function includes means for storing a large number of samples in such a manner that radiation from this storage area does not interfere with the measurement function. The storage function in the present device also includes sequencing of the samples to provide the proper sample at the proper time to the transport mechanism. The measurement function is carried out in the detector unit, where the vial containing the liquid sample is inserted within the core of a well type radiation measuring instrument which detects the radioactive particles and transmits this information as electrical pulses to an electronic scaler. The scaler records the pulses and at the end of a preset time or a preset number of counts returns an indicating signal to the sample changer apparatus. The transport function is accomplished by a transport arm operating from a lead screw drive. The transport arm must be capable of motion up, over and down in carrying the sample from the storage unit to the detector unit. This sequence must be reversed in returning the sample to the storage unit. The present device provides this three way motion from one drive mechanism, a lead screw with a self-reversing thread, operating in conjunction with a cam groove, utilizing the tower casing as a cam. Thus the changes in direction are accomplished without switching, clutches, or the like. To reverse the process the motor driving the lead screw is reversed, and the motion is thereby carried out in reverse order.

Referring again to FIG. 1 the storage function is accomplished within the cylindrical section of the base casting 11 in a manner which will be described in more detail at a later point, while the sample counting function is accomplished in the shielded detector 14 which is a separate unit mounted on the base casting 11. The transport function is accomplished by the transport arm assembly 15 which is operated by the mechanism within tower 13. This transport arm assembly and tower constitute a sub-unit which is mounted on casting 11. The detector unit 14 is electrically coupled to proper scaling and readout electronic equipment (not shown) for computing and storage. The front panel 12 is an electrical control subassembly mounted on casting 11 and providing controls for applying A.C. power, indicating lights, and selector knobs for particular sequencing cycles. Samples are initially loaded into the storage area through a loading port, which in FIG. 1 is covered with a removable cover 22. The carrier assembly 15, which moves along a path defined by slot 23, is driven to the lower limit of slot 23 placing the pickup probe 25 of this arm within access port 26 of the storage unit 11. There, again in a manner to be described in detail below, the sample vial 16 which is generally a glass tube with a cap 18 of magnetic material, is magnetically attached to the pickup probe 25, the carrier arm 15 then moving up one channel of slot 23, and down the other channel of slot 23 to point 31. The sample vial 16 is, at this point, within detector unit 14 for measurement.

For purposes of clarity each one of the above-mentioned functional areas will be described in detail separately prior to a description of the overall sequencing and controls and cooperative relationships of these areas.

*The Detector Unit*

Figure 2:
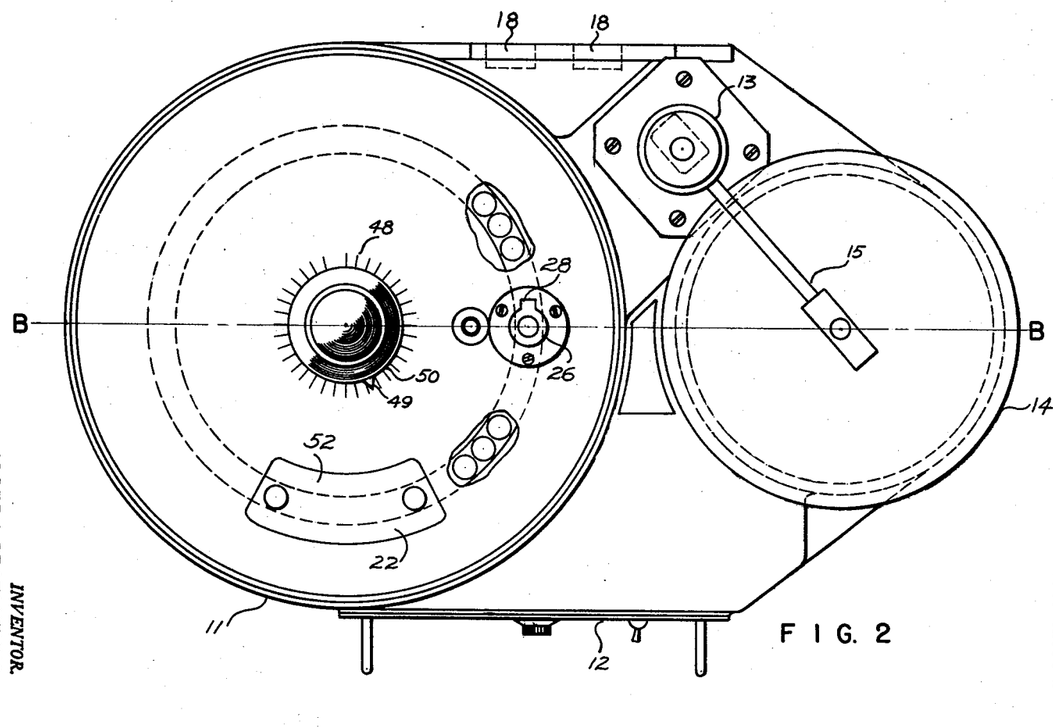
FIG. 2 is horizontal cross sectional view taken along the line AA of FIG. 1, including some partial breakaways to show internal structure.
Figure 3:
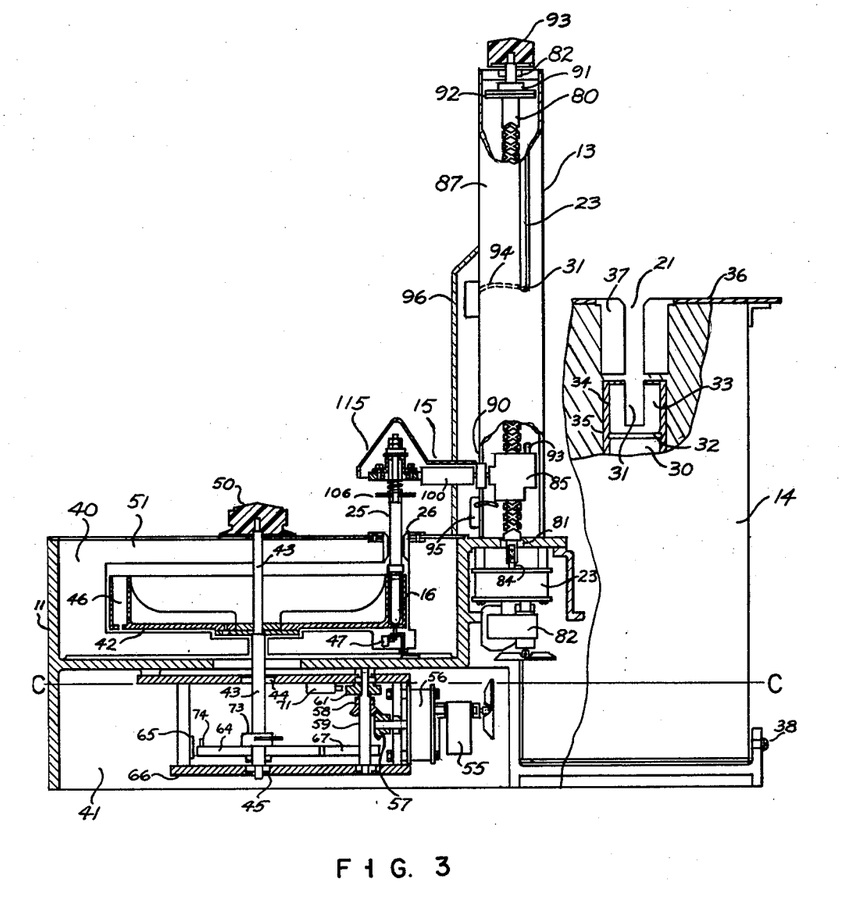
FIG. 3 is a vertical cross sectional view taken along the line BB of FIG. 2.

The detector unit, generally indicated in FIG. 1 and indicated with a breakaway portion to show a section of the internal construction in FIG. 2, consists of a well scintillation crystal unit mounted in a specially adapted shield 14 which is in turn mounted on base casting 11 of this apparatus. The shielding material which fills most of the cylinder volume can be of lead, iron, or other convenient gamma ray shielding material. The shield contains a hollow core 35 into which is inserted the electronic assembly and photomultiplier 30 with the photomultiplier photocathode 32 facing upward as indicated in FIG. 3. The well scintillation crystal 33 is mounted within a retaining casing 34 with one end of the crystal 33 substantially flush to the photocathode window 32 and the face containing the cup-shaped cylindrical opening 31 aligned with a cylindrical opening 21 in the top of the shield unit. The shield unit has a top plate 36 with a hollow core cylindrical plug 37 attached to it and extending downward within the shielding unit 14. A tapered orifice 21 at the top of this plug 37 provides an opening and a guide for lowering the sample vial into position within the hollowed out core of scintillation crystal 33. The overall detector unit 14 is placed within a recessed mounting area of base casting 11 and, after proper alignment with respect to the tower unit 13 and transport arm assembly 15, is fixed in position by means of a set screw 38.

While the unit as described here employed a photomultiplier and well scintillation counter, is it obvious that a detector unit featuring a well gamma geiger counter and associated electronic preamplifier would serve adequately. The information from the detector is transmitted to an electronic scaler (not shown) which may be connected through recessed sockets 18 at the rear of casting 11.

*Storage Unit*

Referring to FIGS. 1, 2 and 3, the circular area of the base casting 11 which contains the storage unit is seen to be divided into two vertical compartments 40 and 41. The upper compartment 40 contains the storage carriage 42 while the lower compartment 41 houses the operating mechanism for the storage carriage. The storage carriage 42 is a ring-shaped metallic basket which, in this embodiment, has separate compartments around its periphery for storing 50 sample vials. It is fixed to a rotating shaft 43 mounted in bushings at points 44 and 45. The bottom of each compartment 46 is provided with an opening and when any compartment is located under access port 26 the bottom of a vial 16 within the compartment actuates the sensitive element of a feeler microswitch 47, the condition of which then indicates the presence or absence of a sample vial within the particular compartment of the carriage. The remainder of compartment 40 is occupied by a shield, preferably of lead or any suitable high Z material for absorbing the gamma radiation from the sample vials and thus reducing the background external to the apparatus and in particular in the area of the detector. If the radiation level is not of such a magnitude this volume could be left empty. A knob 50 is mounted external to the base casting 11 and top plate 51 on shaft 43 and is used to manually rotate the shaft and hence the storage carriage in order to insert the samples through the loading port 52. An access port 26 located on the cover plate 51 of the storage area provides access for the pickup probe 25 of transport assembly 15 to make contact with the sample located beneath the access port. This port has a conical opening which serves to guide and properly center the pickup probe as it descends. It also includes a key slot 28 which allows the foot 53 attached to the pickup probe clearance as the pickup probe descends through the access port into the position shown in FIG. 2.

As indicated above, the lower compartment 41 of the storage unit includes the mechanism which automatically indexes the storage carrier 42 to provide the proper sample in the proper sequence to transport assembly 15 and further provides electrical signals to assure proper sequencing of the transport arm function. The details of this lower compartment construction are most clearly seen from the vertical cross-sectional view of FIG. 3 and the horizontal cross-sectional view of FIG. 4. An electric motor 55 operates through a gear reduction system enclosed in casing 56 to drive bevel gear 57, which in turn drives bevel gear 58 mounted on vertical shaft 59, hence rotating the veritcal shaft 59. The sequencing control which starts and stops this electric motor 55 will be described at a later point. An irregularly shaped cam 61 and a pivot arm 62 are fixed to shaft 59 and therefore rotate with it. Arm 62 has an adjustable tip section 63 which is adjusted such that when in the position shown in FIG. 4a it makes sufficient contact so that on each rotation of the arm it moves the index gear 64 one notch. The action of this gear in moving the same distance for each rotation of the pivot arm 62 is further assured by the operation of detent mechanism 65 which is mounted to a fixed plate 66 rigidly attached to the casting 11. The detent mechanism 65, as is most clearly shown in FIG. 4, has an arm 67 holding a ball 68 of a diameter sufficient to occupy the entire gap between teeth, the whole being spring loaded to assure positive action.

The indexing gear 64 is attached to the lower portion of shaft 53 and hence for each rotation of arm 62 the shaft rotates through an arc determined by the number of teeth on the indexing gear. In the illustration shown there are 50 teeth on the gear 64 and there are 50 sample compartments in carriage 42 which, being fixed to shaft 43, also rotates with the rotation of the index gear 64. The relative positions of the storage carrier 42 and the index gear 64 on the shaft are adjusted so that the stopping position of the gear exactly aligns one sample compartment beneath access port 26. Thus each rotation of pivot arm 62 acts to index the sample carrier 42 one sample compartment and when this is properly correlated with the action of transport arm 15, the samples which have been manually placed in the storage assembly unit are sequentially removed, transferred to the detector, counted and returned to the storage carrier. During operation the identification of each sample being counted is indicated by indexing marks 48 around the knob 50 which may have an indicator 49 on it as shown in FIGS. 1 and 2. The sequencing of this storage carrier action with the transfer arm action is controlled, in part, by a series of microswitches 70, 71 and 72, operating in conjunction with both rotation arm 62 and cam 61. Microswitch 73 is rigidly mounted to the top section of compartment 41 casting and is triggered by a single pin 74 located on the periphery of the indexing gear 64 and it is aligned with marking indicators around knob 50 to correspond with the number one. The microswitch 73 provides a signal when one complete revolution of the index gear and storage carrier 42 has been completed. The sequential action of microswitches 70, 71 and 72 will be described in detail below under the section on controls.

The Transport Unit

Figure 4:
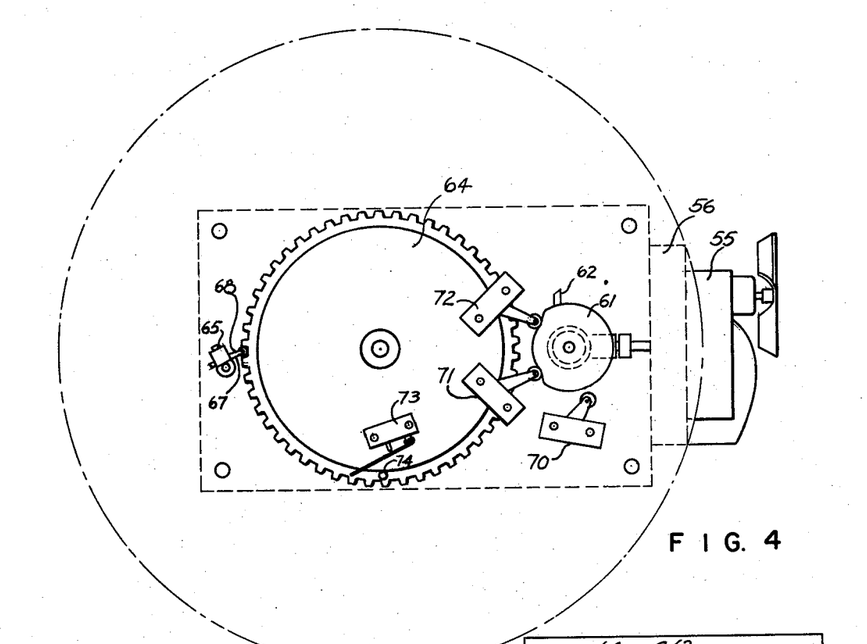
FIG. 4 is a horizontal cross sectional view taken along the line CC of FIG. 3 and including only a portion of the apparatus.
Figures 4A, 5:
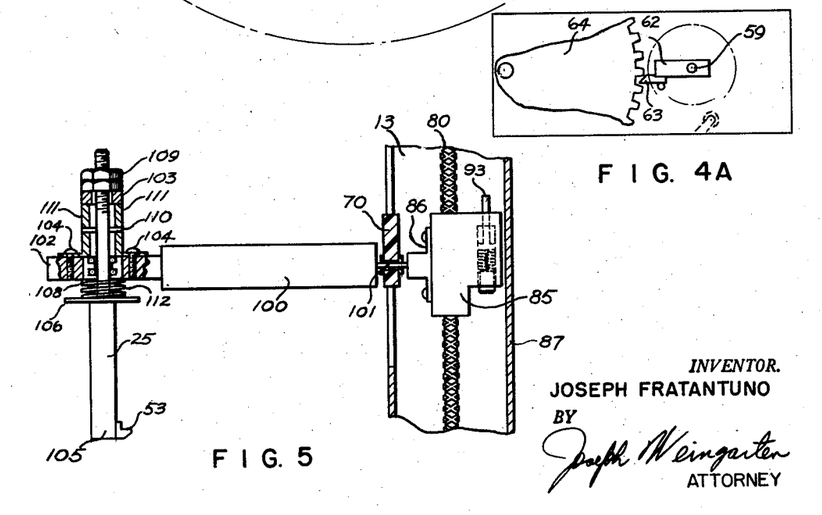
FIG. 4a shows a detail of a portion of the apparatus of FIG. 4.
FIG. 5 is a detailed illustration of the carrier arm of the apparatus of this invention.

The transport unit is indicated generally in FIG. 1 and in more detail in cross-sectional views shown in FIG. 3 and FIG. 5. As described above, the function of the transport mechanism is to pick up the sample from storage area 11, transfer it to detector unit 36, and after measurement has been completed, return it to storage unit 11, picking up the next sample in sequence and repeating the operation. The transport unit can best be understood by considering it in two separate parts, one being the drive mechanism for accomplishing the motion and the second being the mechanical detail of the arm and probe itself.

The drive unit for the transport function is contained in the tower 13 which, as shown most clearly in FIG. 2, encloses a lead screw shaft 80 mounted in bearings 81 at the top and the bottom of the tower. An electric motor 82, capable of driving in either direction at a constant speed, is coupled through a gear box 83 to shaft 84 which is in turn coupled to lead screw 80. Lead screw 80 is threaded from a point near the bottom of the shaft to a point a short distance removed from the top of the shaft, and further at this latter point the thread is self-reversing in such a way that a follower which travels up the lead screw when it is rotating in one direction will, when it reaches the top, reverse and travel down the lead screw even though the rotation remains in the same direction. A lead screw follower unit 85 is formed of a block of plastic having a hollow core containing a follower pin (not shown), which pin rides in the thread and the lead screw imparts vertical motion to the follower block 85. The transport arm 15 is rigidly attached to the lead screw follower block 85 by a connecting plate 86, maintaining the transport arm in an absolute fixed relationship to the lead screw follower block.

A metal casing 87 forms the outer surface of tower 13 and contains, as best illustrated in FIGS. 1 and 3, a slot 23 running from a point near the access port 26 of the storage unit vertically up to a fan shaped opening 27 at the apex and then running down to a terminal point 31 near the detector opening 21. This slot actually operates as a cam groove by which a cam groove follower 90 which is pivotally mounted on transport arm 15 controls the horizontal position of the transport arm as the lead screw 80 drives the transport arm vertically. For example, as the transport arm moves vertically upwards from point 24 it is given counter-clockwise horizontal motion (as viewed from top of tower) by the effect of the groove 23 slanting to the right on tower 13 as it approaches the apex. The apex 27 is located to coincide with the top of the thread on lead screw 80 so that when the transport arm reaches this point its vertical direction is reversed and the fan-shape of the cam groove at this point aids in directing the cam groove follower into the right hand channel of the cam groove descending to point 31.

In order to make this action more positive a thrust in the counter-clockwise direction is given by a mechanism associated with the lead screw follower 85. Thus at the top of the lead screw 80 a metal flange 91 is pinned to shaft 80 and a washer 92 formed of high friction material, such as roughened leather or the like, is adhered to the lower surface of this flange.

A plunger 93 is mounted on one side of lead screw follower 85 and spring loaded to maintain it in its uppermost position as is most clearly shown in FIG. 5. When the lead screw follower 85 reaches the top of the threaded portion of the lead screw, plunger 93 comes in contact with the roughened washer surface 92 of flange 91 which, since it is fixed to the shaft, is rotating in a counter-clockwise direction. The frictional torque now created between plunger 93 and the surface 92 gives a counter-clockwise thrust to the entire lead screw follower and hence makes more positive the action of the transport arm 15 in descending along the right hand channel.

A hand knob 93 is attached to the uppermost end of shaft 80 external to the tower 13. This knob permits manual operation for positioning or the like of the transport arm by means of rotating the shaft. Microswitches 94 and 95 are located with their sensitive elements in a vertical position corresponding to point 31 and point 24, respectively, and serve to provide an electric signal to the electrical control circuit when the lead screw follower 85 reaches either of these points. Through this means electric motor 82 is controlled and proper positioning of the transport arm in regard to the storage unit and the detector unit is accomplished. The entire sequence will be described in more detail below. A dust cover 96 of plastic or the like is mounted over the microswitches external to the tower 13 in order to prevent dust, moisture, and the like from interfering with their action. This entire tower assembly forms a sub unit which is mounted to the main casting 11.

Having described the mechanical drive aspects of the transport unit, the detail of the transport arm 15 and pickup probe 25 will now be discussed. The arm of the transport assembly 15 consists of a bar 100 which is rigidly mounted to coupling plate 86 by pin 101. The cam groove follower 90 is pivotally mounted on pin 101.

The bar 100 terminates in a mounting plate 102 to which is mounted the pickup probe 25. A tubular housing 103 is attached to mounting plate 102 by means of screws 104, the flange part of housing 103 being slotted in order to provide horizontal adjustability in mounting this housing. The probe 25 itself is a steel bar with a permanent magnet 105 mounted in its lower end, the magnet having a concave lower surface in order to adhere satisfactorily to the slightly convex metal caps of sample vials 16. At the upper end of this probe it is formed into a flange 106 to which is attached a bolt 107 which runs through thrust bearing 108 and is attached to the top of housing 102 by locking nut arrangement 109. Pin 110 pierces bolt 107 and is affixed thereto. It rides in slot 111 which extends through the cylindrical housing 103, thereby allowing some vertical play in the probe position; however, the edges of slot 111 define limits for this movement. This vertical adjustability allows for some discrepancy in the height of sample vials 16. A spring 112 inserted between mounting plate 102 and flange 106 makes the probe's normal position be at its lowest point of travel with respect to the plate 102. A plate cover 115 covers the whole transport arm assembly.

A ski-shaped foot 53 is affixed at the lower end to one side of the pickup bar probe 25. The purpose of this foot is to guide the pickup probe if a vial which is relatively short is followed in the storage compartment by a relatively high vial so that the probe end will not jam against the slightly increased height of the second vial.

*Sequence*

Having described the mechanical construction of the apparatus of this invention, the sequence of operation will now be discussed; however, the actual electromechanical control system which accomplishes this sequence will be discussed in a later section.

To start the sequence, the sample vials are loaded into the storage carriage 42 in the manner described earlier. It should be noted, however, that if there is not a full complement of vials the spacing of the vials in the carriage makes no difference since the apparatus recognizes an empty compartment and indicates this to the recording apparatus and moves to the next compartment without actually going through the transport part of the cycle. When the storage carriage has been loaded the transport arm 15 is manually lowered into access port 26 by turning knob 93 on top of tower 13. When the sample vial under the access port has been picked up by the magnet on the bottom of the probe the start button on control panel 12 is pushed and the apparatus then operates automatically.

In automatic operation the transport arm rises through the cam groove 23 on the tower 13 to the top and then descends in the other channel of the cam groove till it reaches point 31, at which point the sample vial on the end of the pickup probe is now within the detector core and the motor 83 on the transport unit is shut off by the action of microswitch 94. An external scaler unit (not shown) coupled to the detector section of the apparatus now totalizes the radiation count from the detector and provides a signal at the end of either a predetermined time or a predetermined total count, which signal now operates motor 82 in the opposite direction; hence the transport arm, traveling over the same thread in shaft 80, now rises from point 31 and from the plunger and disc combination at the top of shaft 80 receives a positive thrust in a clockwise direction and travels down the left hand channel of the cam groove until it reaches point 24 where the action of microswitch 95 turns off motor 82. At this point the sample vial has been returned to the compartment in the storage carriage from which it originally came and, through a control arrangement which will be described later, motor 55 operates rotating shaft 59 and hence arm 62 through one revolution. This indexes index gear 64 one notch and hence moves the storage carriage 42 one compartment so that a new compartment is now underneath the pickup probe in the access port. The movement of the storage carriage 42 overcomes the magnetic attraction which existed between the pickup probe and the sample vial which had been in the first compartment and the sample vial in the second compartment now attaches to the pickup probe. The transport arm 15 then rises and places the second sample in the detector and the sequence is repeated.

Thus, each sample is counted until the storage carriage returns to its original position, which is indicated by the action of the pin 74 aligned with the first compartment, triggering microswitch 73. A selector switch in the electromechanical control system may be preset so that each sample in the storage unit may be counted sequentially any desired number of times or so that the apparatus will continually count the samples until it is manually turned off. As indicated earlier, if a compartment does not contain a sample vial then microswitch 47 is not actuated, and this acts through the control system so that that part of the cycle which consists of the transport arm rising and going to the detector and the sample being counted is not initiated, but rather the next compartment is moved into place. If an external print-out recorder is used in conjunction with the scaler (which may be desirable under normal circumstances in order to obtain a record of all the sample counts), it may be arranged to indicate the compartment number and a zero indication for compartments which do not contain samples, thus avoiding any confusion as to the identity of the sample being counted.

*Electromechanical Control System*

Figure 6:
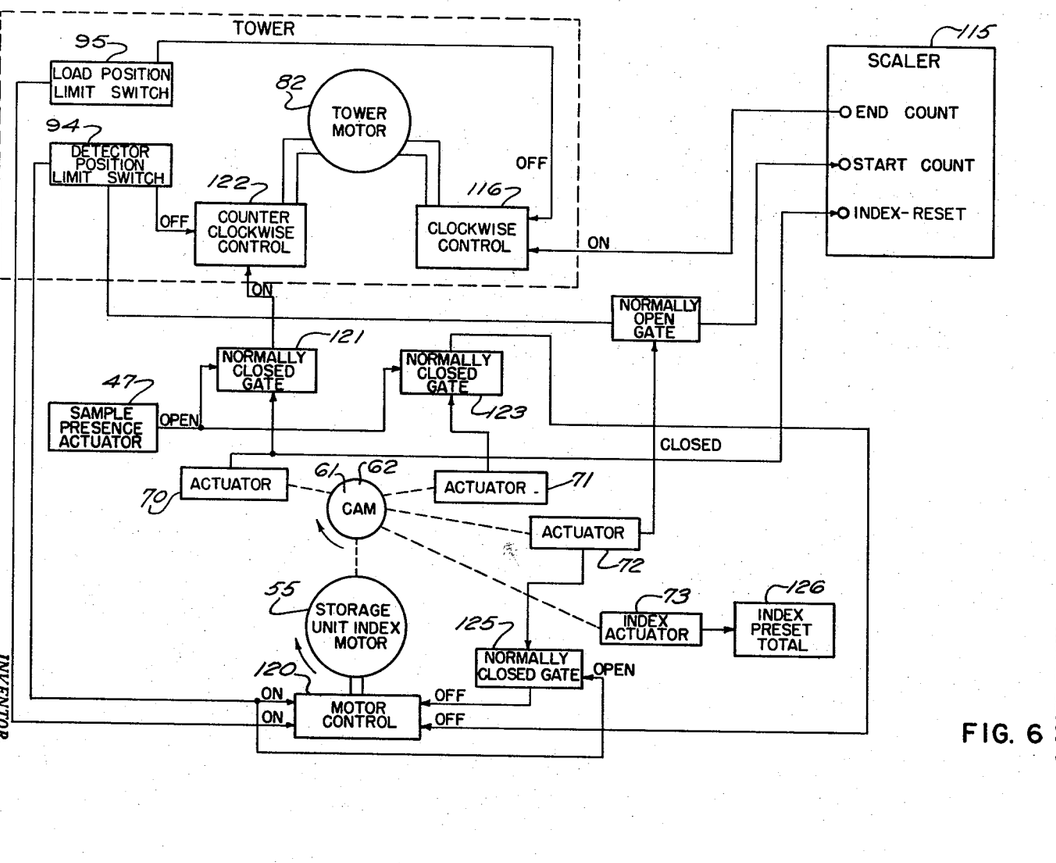
FIG. 6 is an illustration in block diagrammatic form of the electromechanical control of the apparatus of this invention.

The electromechanical control system for this apparatus is illustrated in FIGS. 4 and 6. FIG. 4 illustrates the mechanical cam-microswitch arrangement on the storage carriage indexing, while FIG. 6 is a block diagram of the overall electrical control. Turning now to FIG. 6 the entire sequence will be traced and for convenience the operation will be traced starting at the point where a sample is in the detector and being counted.

At the end of the preset count or preset time, whichever comes first, a signal is transmitted from scaler 115 to the clockwise control unit 116 for tower motor 82 and this signal turns on the tower motor in a clockwise direction. The transport arm 15 which is now in position 31 on the cam groove 23 moves up the cam groove and down on the other channel of the groove until the lead screw follower 85 trips microswitch 95 which serves as the low position 24 limit switch. The tripping of this switch sends a signal as indicated in FIG. 6 to the clockwise control 116 of tower motor 82 and turns this motor off, thus halting the motion of the transport arm. The actuation of switch 95 also sends a signal to the motor control 120 for storage unit index motor 55, turning this motor on.

During the counting cycle the cam 61 and arm 62 are in the position as shown in FIG. 4; thus when the storage unit index motor 55 is turned on it rotates shaft 59 in a counter-clockwise direction and arm 62 interacting with index gear 64 advances this gear one notch. The arm then continues around and actuates microswitch actuator 70 which provides a pulse to scaler 115 to accomplish the indexing-reset function in the scaler. The index-reset function is to reset the scaler preparatory to the next count and to print out the answer of the past count. This actuator 70 also provides a signal to gate 121 which is normally closed but which is opened by a signal from sample presence actuator 47 which is the feeler microswitch underneath the sample compartment. The action of this unit is such that if a vial is in the sample compartment then the actuator 47 provides an open signal to gate 121, thus allowing the signal from actuator 70 to pass through this gate and turn on counter-clockwise control 122 of tower motor 82.

The tower motor operation then proceeds to lift the transport arm 15 out of the access port with the sample vial 16 attached to the pickup probe and release actuator 95. Shaft 59 and hence cam 61 and arm 62 continue to travel in the counter-clockwise direction until actuator microswitch 71 is triggered by descending into the depression in cam 61. When this occurs actuator 71 provides a signal which goes to a second gate 123 which is closed unless the sample presence actuator 47 was actuated, in which case it is open. If gate 123 is open the signal is transmitted to motor control 120 for the storage unit index motor and turns this motor off. In the case therefore where a sample actually was in the compartment, the tower motor 82 continues to move the transport arm until it reaches point 31 and trips the detector position limit switch 94. If this switch is tripped it turns off the counter-clockwise control 122 for the tower motor, provides a signal through normally open gate 124 to scaler 115 to start the counting in the scaler, and also provides an on signal to motor control 120 for the storage unit index motor. After the count has started, this motor turns the cam so that microswitch actuator 72 is actuated, which provides a pulse to gate 124. The effect of the pulse from actuator 72 closing normally open gate 124 is to interrupt the signal from detector position limit switch 94 to the start-count function in scaler 115, thereby allowing the scaler to stop at the end of the count and not automatically restart. A pulse from actuator 72 also is transmitted through the gate 125 which, although normally closed, is open by virtue of the activation of the activation of detector position limit switch 94, to turn off motor control 120 for the storage index motor 55. Since actuator 72 is actuated when the sensitive element of the microswitch falls into the grooved out portion of cam 61 the index motor 55 stopped with the cam in the position again as shown in FIG. 4 and the cycle has been completed, since a sample is now being counted in the detector.

The sequence is somewhat varied when, after the sample has been returned to the storage unit, a compartment which does not in fact contain a sample vial is moved underneath the access port 26. In this latter case the sample presence actuator 47 is not actuated and hence does not provide an open signal to gates 121 and 123. In this case actuator 70 provides a signal to gate 121 which now is closed; it therefore does not transmit a signal to turn on the clockwise control 122 of tower motor 82. The signal from actuator 70 does, however, reach scaler 115 and reset and index, which indicates that a sample compartment has been indexed but that it contains no sample. The cam 61 continues around and actuates actuator 71; however, the signal from actuator 71 again goes no further than normally closed gate 123 which has not been opened. Accordingly, the storage unit index motor is not turned off as in the previous sequencing, but rather the cam continues and triggers actuator 72, which provides a signal closing normally open gate 124, which action does not have any effect since in fact detector position limit switch 94 is not now actuated. The signal from actuator 72 also goes to gate 125 which is normally closed and, as indicated above, is opened only by the actuation of detector position switch 94. Here again, since the tower motor action was never initiated, the transport arm 15 is not in the position to trigger detector position switch 94; hence gate 125 remains closed and the signal from actuator 72 does not reach motor control 120. The storage index motor 55 then continues to run and arm 62 makes a second revolution advancing the index gear 64 and of course the storage carriage 42 another compartment. At this point the sequence either follows the original sequence of the transport arm picking up a sample and moving to the detector or continues around in the sequence just described, depending on whether a sample is in fact in this next compartment.

When all 50 compartments of the storage unit carrier have been indexed into position and the samples contained therein have been counted, then pin 74 which is located on the periphery of the index gear trips microswitch actuator 73, thus indicating completion of one complete cycle. This index actuator signal is supplied to a selector switch 126 which may be preset to count 1, 2 or 3 or more specific cycles or to continuously cycle the apparatus. If this selector has been set to count a fixed number of cycles, it acts to shut off the electric power from the apparatus when that number of cycles has been completed.

It will, of course, be understood that what has been described above is a particular embodiment of the invention herein disclosed and that although specific detail for this embodiment has been discussed, the invention should not be so limited. It is, for example, obvious that many additional features may be included in such an apparatus to provide for power shutoff and the like if there is any jamming of mechanism and for an indicator if electric power is inadvertently cut off and then resupplied, etc. From the foregoing it is obvious that many modifications and improvements may now be made by those skilled in this art. The invention disclosed herein should be construed as limited only by the spirit and scope of the appended claims.

What is claimed is:

1. Radioactive sample processing apparatus comprising, storage means for delivering each of a plurality of radioactive samples arranged therein in a predetermined fixed order in sequence to an access point; detector means adapted to measure the disintegration rate of radioactive samples, said detector being disposed above and in horizontally displaced relationship with respect to said storage means; transport means adapted to individually withdraw one of said samples from said fixed order and to transport said withdrawn sample both vertically and horizontally from said access point to said detector means and to return said sample to said fixed order at said access point prior to transporting the next sequential sample.

2. Radioactive sample processing apparatus comprising, storage means for delivering each of a plurality of radioactive samples in sequence to an access point; detector means disposed in elevated and horizontally spaced relationship with respect to said storage means; transport means for transporting a sample from said access point and returning said sample to said access point prior to transporting the next sequential sample, said storage means comprising a substantially circular carrier having a plurality of recesses disposed around its periphery, each of said recesses being adapted to hold a respective one of said plurality of radioactive samples in predetermined fixed order, said carrier being rotatable, whereby each of said samples may be presented in sequence to said access point.

3. Radioactive sample processing apparatus comprising, storage means adapted to deliver each of a plurality of radioactive samples arranged therein in a predetermined fixed order in sequence to an access point; detector means disposed above said storage means in horizontally spaced relation thereto; sample transport means; means for actuating said transport means, operating in one direction for moving a sample from said access point in a vertical direction, rotating said sample horizontally, and thereafter moving said sample in the opposite vertical direction into operative association with said detector means, and means for actuating said transport means in the reverse direction to reverse said motions of said sample, whereby said sample is returned from said association with said detector means to said storage means in said fixed order at said access point prior to transport in like manner of the next sequential sample.

4. Apparatus as in claim 3 wherein said transport means comprises a vertical lead screw having a self-reversing thread; a reversing motor adapted to reversibly drive said lead screw; a follower engaging said lead screw to travel axially to said self-reversing point and thereafter axially away from said self-reversing point when said lead screw rotates in one direction and to reverse this travel when said lead screw rotates in the opposite direction.

5. Apparatus as in claim 3 wherein said transport means comprises a vertical lead screw having a self-reversing thread; a reversing motor adapted to reversibly drive said lead screw; a follower engaging said lead screw to travel axially to said self-reversing point and thereafter axially away from said self-reversing point when said lead screw rotates in one direction and to reverse this travel when said lead screw rotates in the opposite direction; a housing enclosing said lead screw shaft and formed with a guide defining a path having horizontal and vertical components, said follower being adapted to travel in said guide, thereby having horizontal and vertical components of motion imparted thereto; sample holding means coupled to said follower externally of said housing whereby the horizontal and vertical motion components of said follower are imparted to said sample holding means thereby accomplishing the sample transport function.

6. Radioactive sample processing apparatus comprising, storage means adapted to store a plurality of radioactive sample containers for receiving radioactive material in liquid and powder form and to deliver each of said containers sequentially to an access point, each of said containers being formed with a magnetic element; detector means disposed above and in horizontally displaced relationship with respect to said storage means; transport means adapted to transport each of said containers in sequence from said access point to said detector means and to return said container to said access point, said transport means having a container pickup arm extending therefrom, said pickup arm having a permanent magnetic element for gripping the respective element of each of said containers to accomplish the transport function.

7. Radioactive sample processing apparatus comprising, sample storage means, said storage means having individual recesses adapted to hold respective sample containers therein in predetermined fixed order and to deliver each of said sample containers sequentially to an access port without change in said fixed order; detector means disposed above and in horizontally displaced relationship with respect to said storage means, said detector means being formed to allow insertion of said sample containers within said detector means; transport means adapted to remove sequentially and individually each of said sample containers vertically from said storage means through said access port for transport to and insertion within said detector means, said transport means also being adapted, in response to an externally applied stimulus, to sequentially and individually withdraw each of said sample containers from said detector means for return through said access port to said fixed order in said storage means prior to transport in like manner of the next sequential sample.

8. Apparatus in accordance with claim 7 wherein said storage means includes bypass means, said bypass means operating to preclude operation of said transport means when any of said individual recesses without a sample container is delivered to said access port, said bypass means also operating to deliver the next sequential sample container to said access port.

9. Apparatus as in claim 7 wherein said storage means comprises a rotatable carriage, said carriage having recessed compartments disposed around the periphery thereof, each of said compartments being formed with a lower access opening; sensing means disposed beneath said access port and beneath said carriage and extending partially through said lower access opening of the compartment beneath said access port, said sensing means being actuated only when said compartment beneath said access port contains a sample container; and means responsive to said sensing element in the absence of a container in said compartment beneath said access port to preclude operation of said transport means and cause said carriage to be rotated to position the next sequential compartment beneath said access port.

10. Radioactive sample processing apparatus comprising a base member, a portion of which is formed as an enclosed cylindrical housing; sample storage means included within said enclosed portion adapted to store a plurality of radioactive samples, said enclosed portion being formed with a loading port to provide for manual loading of said plurality of samples into said storage means, said enclosed portion having an access port whereby each of the said plurality of samples may be individually removed, said storage means being adapted to provide sequentially each of said plurality of samples to a position beneath said access port; detector means adapted to measure the radioactive disintegrations from each of said plurality of samples, said detector means being mounted on said base at a point separated horizontally and vertically from said access port; transport means comprising a tower and a pickup arm mounted thereon, said tower being mounted on said base in a position intermediate said storage means and said detector means, said transport pickup arm being adapted to move vertically and rotatively about said tower to sequentially transport each of said samples from said access port to said detector means and to return said sample from said detector means to said access port.

11. Apparatus in accordance with claim 10 wherein said transport means comprises a rotatable shaft mounted with its axis in the vertical position, said shaft having a self-reversing thread with the reversing point located at a point near the top of said shaft; a hollow cylinder mounted concentrically outside of said shaft and coextensive in the vertical direction with said shaft, said cylinder being fixedly mounted to said base member, said cylinder having a slot through said cylinder wall beginning at a point near said access port and rising to a fan-shaped apex at a point vertically corresponding to said self-reversing point, said slot descending from said apex point to a termination at a point near said detector means; a follower engaging said shaft and having a portion extending through said slot such that upon rotation of said shaft in one direction said follower travels from the point near said access port to the apex of said slot and descends in said slot to the termination point near said detector; a disk of diameter less than the inner diameter of said cylinder and formed with a lower surface of high friction material mounted on the top of said shaft; a spring-loaded plunger mounted in the top of said follower so that it comes in contact with said lower surface of said disk when said cam follower reaches the self-reversing point of said shaft, whereby said cam follower is given a torque in the direction of rotation of said shaft to insure its descending in said slot; a reversible motor coupled to said shaft operating to drive said shaft in one direction to transport said samples from said storage means to said detector means, and to drive said shaft in the opposite direction to reverse this motion.

12. Apparatus in accordance with claim 10 wherein said storage means comprises a circular carrier having a plurality of individual compartments disposed around its periphery; a shaft member mechanically coupled to said carrier member; a circular gear member coupled to said shaft member, said gear member having gear teeth disposed around its periphery, the number of said teeth corresponding to the number of compartments in said carrier; indexing means mounted adjacent to said gear member adapted to rotate said gear member a distance of one gear tooth for each revolution of said index member; an indent assembly mounted adjacent to said gear member, said indent assembly being adapted to provide that said gear member move the same distance for each rotation of said index member.

13. Automatic radioactive sample processing apparatus comprising, storage means for storing and providing in sequence to an access point each of a plurality of radioactive samples; detector means adapted to measure the radioactive disintegrations from each of said samples, said detector means being located above and in horizontally displaced relationship with respect to said storage means; transport means adapted to transport sequentially each of said samples from said storage means to said detector means; control means adapted to provide a sequence of operation of said apparatus such that said transport means transports one of said plurality of samples from said storage means to said detector means, said detector means measures said sample for a predetermined interval, said transport means then returns said sample to said storage means, said storage means then provides the next sequential sample to said transport means, said transport means repeating its said operation for said second sample, said operation continuing for a predetermined number of samples; means included within said control means for measuring each of said plurality of samples a predetermined number of times.

References Cited in the file of this patent

UNITED STATES PATENTS

| | | |
|---|---|---|
| 2,490,298 | Ghiorso | Dec. 6, 1949 |
| 2,843,753 | Meeder | July 15, 1958 |
| 2,907,881 | Roucayrol | Oct. 6, 1959 |
| 2,924,718 | Packard et al. | Feb. 9, 1960 |

OTHER REFERENCES

Automatic Sample Changer for Well-Type Scintillation Counter, by Demorest et al., from Nucleonics, vol. 12, No. 7, July 1954, pp. 68 and 69.